(12) United States Patent
Waldo et al.

(10) Patent No.: US 10,190,021 B2
(45) Date of Patent: Jan. 29, 2019

(54) FLOOR COATING COMPOSITIONS AND FLOORING MATERIAL

(71) Applicant: Dexerials America Corporation, Suwanee, GA (US)

(72) Inventors: Rosalyn Waldo, Suwanee, GA (US); Helen Yan, Suwanee, GA (US); Ryosuke Endo, Suwanee, GA (US)

(73) Assignee: DEXERIALS AMERICA CORPORATION, Suwanee, GA (US)

( * ) Notice: Subject to any disclaimer, the term of this patent is extended or adjusted under 35 U.S.C. 154(b) by 58 days.

(21) Appl. No.: 15/594,801

(22) Filed: May 15, 2017

(65) Prior Publication Data
US 2018/0327630 A1    Nov. 15, 2018

(51) Int. Cl.
| | | |
|---|---|---|
| C09D 175/04 | (2006.01) |
| C08L 33/12 | (2006.01) |
| C08F 2/50 | (2006.01) |
| C08K 3/22 | (2006.01) |
| C08K 5/00 | (2006.01) |
| C08K 3/36 | (2006.01) |

(Continued)

(52) U.S. Cl.
CPC .............. *C09D 175/04* (2013.01); *C08F 2/58* (2013.01); *C08K 3/22* (2013.01); *C08K 3/36* (2013.01); *C08K 5/0025* (2013.01); *C08L 33/12* (2013.01); *C08K 2003/0812* (2013.01)

(58) Field of Classification Search
CPC . C09D 175/04; C08F 2/50; C08F 2/58; C08L 33/12; C08K 3/36; C08K 3/22; C08K 5/0025; C08K 2003/0812
See application file for complete search history.

(56) References Cited

U.S. PATENT DOCUMENTS 3,899,611 A * 8/1975 Hall ................. C08F 290/06
                                                           427/488
5,843,576 A    12/1998 Rosenberry et al.
(Continued)

OTHER PUBLICATIONS

Weissman, Field-Applied, UV-Curable Coatings for Concrete Flooring, Radtech Report, Jan./Feb./Mar. 2009, pp. 25-32.

*Primary Examiner* — Jessica M Roswell
(74) *Attorney, Agent, or Firm* — Paratus Law Group, PLLC

(57) ABSTRACT

There is provided a floor coating composition used for coating of a floor, which has improved performance and durability without a boundary between the cured and uncured areas. Also provided is a floor coating composition for flooring material, which contains components (A) to (E) below as essential components: component (A): a bifunctional (meth)acrylate compound not having an alicyclic structure; component (B1): a trifunctional or more urethane (meth)acrylate oligomer; component (B2): a hexafunctional or more urethane (meth)acrylate oligomer other than the component (B1); component (C): a melamine (meth)acrylate; component (D): metal oxide nanoparticles; and component (E): an active energy ray polymerization initiator. The amount of component (A) contained is more than 24 weight % and less than 50 weight %, the amount of component (B1) contained is more than 10 weight % and less than 35 weight %, and the amount of component (C) contained is not less than 10 weight % and less than 20 weight %, and component (E) contains a hydrogen abstraction photopolymerization initiator.

9 Claims, 1 Drawing Sheet

(51) Int. Cl.
*C08F 2/58* (2006.01)
*C08K 3/08* (2006.01)

(56) References Cited

U.S. PATENT DOCUMENTS

| | | |
|---|---|---|
| 6,943,201 B2 | 9/2005 | Park et al. |
| 7,498,362 B2 | 3/2009 | Ramsey |
| 8,808,863 B2 | 8/2014 | Russell |
| 2008/0057300 A1* | 3/2008 | Paiva .................. C09D 7/1225 428/336 |
| 2013/0344338 A1* | 12/2013 | Bekiarian .............. B82Y 30/00 428/402 |

* cited by examiner

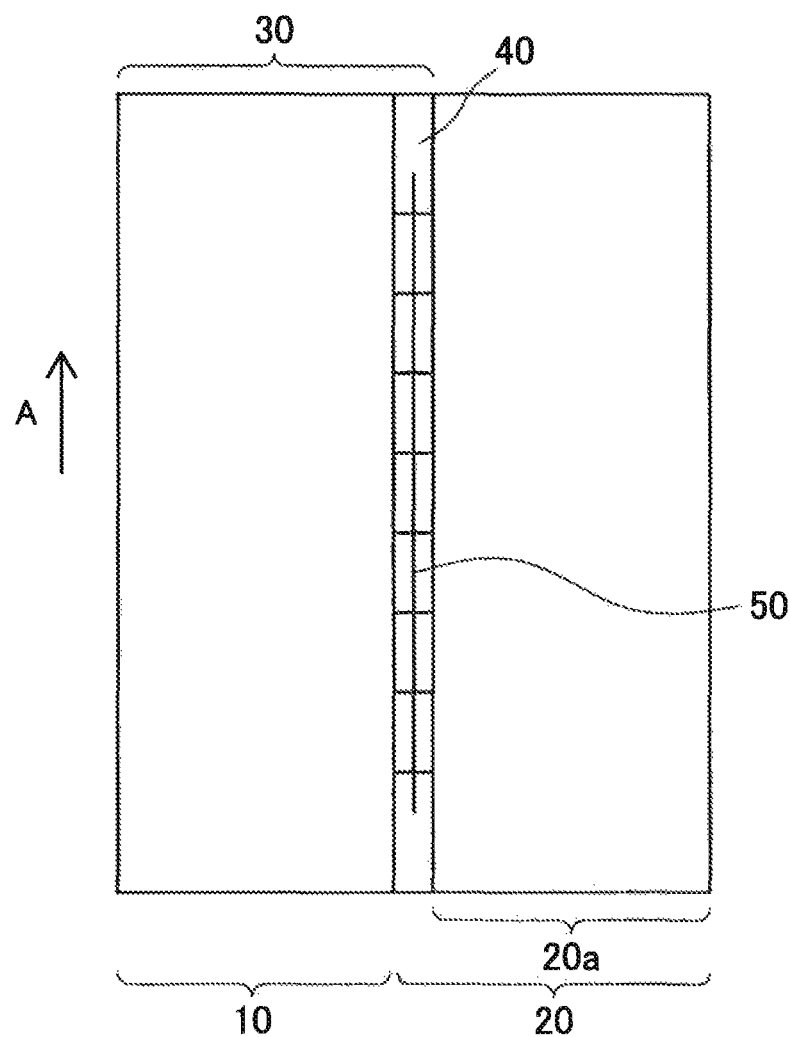

FLOOR COATING COMPOSITIONS AND FLOORING MATERIAL

BACKGROUND

The present invention relates to floor coating compositions and flooring material.

There are cases where wax finishes have been used to improve the gloss and stain resistance of floor surfaces. However, these waxed floor surfaces require periodic maintenance due to insufficient coating durability. In addition, since these wax based coatings and finishes typically include diluting solvents, it is necessary to evaporate the solvents. In the drying/solvent evaporation process, floor traffic is interrupted until the wax coating or finish is completely dried; hence there has been a case where the drying process interferes with business particularly in 24 hours stores and the like.

On the other hand, ultraviolet curable floor coatings are disclosed in U.S. Pat. No. 6,943,201B, U.S. Pat. No. 8,808,863B, U.S. Pat. No. 5,843,576B, and U.S. Pat. No. 7,498,362B, and "Field-Applied, UV-Curable Coatings for Concrete Flooring" January/February/March 2009 RadTech Report, p. 25 to p. 32 (hereinafter, Non-Patent Literature 1). In particular, ultraviolet curable floor coatings are disclosed in U.S. Pat. No. 6,943,201B, U.S. Pat. No. 8,808,863B, and U.S. Pat. No. 5,843,676B, and Non-Patent Literature 1. The ultraviolet curable floor coatings are cured with ultraviolet light after application to floor surfaces. A coating layer formed by the curing of the ultraviolet floor coating has superior durability and performance as compared to the coating layer of a wax coating or finish. Hence, the need for periodic maintenance is reduced. Furthermore, the ultraviolet curable floor coating does not contain a solvent, and therefore does not require a drying process. Thus, the ultraviolet curable floor coating is expected to solve the problems of the wax coatings and finishes described above.

The curing of the ultraviolet curable floor coatings applied on the floor is performed by, for example, the movable ultraviolet irradiation equipment disclosed in Non-Patent Literature 1. Specifically, the worker moves the ultraviolet irradiation equipment over the area where the uncured floor coating has been applied. At that time, the ultraviolet curable floor coating is cured by exposure to a selected and predetermined amount of ultraviolet energy. The worker repeatedly performs the work described above in the areas where the uncured floor coating was applied, thereby curing the remaining areas of the floor coating.

SUMMARY

In the area where the ultraviolet irradiation equipment has passed, the floor coating is satisfactorily cured because ultraviolet light has been adequately applied. It is not unusual for a small amount of ultraviolet light to leak from the ultraviolet irradiation equipment. The ultraviolet light that has leaked from the ultraviolet irradiation equipment cannot cure the floor coating material sufficiently. Hence, the leakage from the curing equipment creates a boundary between the cured and uncured areas. In such an area, there has been a case where a mark like a zipper or a seam called a zipper line, a zipper mark, or the like (hereinafter, such marks are collectively referred to as a "zipper line") remains. Consequently, there has been a problem that such a mark impairs the aesthetics and appearance of the floor.

Hence, a technology that can eliminate the occurrence of a zipper line has been desired. Additionally, increased performance and durability is required of the floor coating.

Thus, it is desirable to provide a new and improved floor coating composition that can eliminate the occurrence of a zipper line and that has improved performance and durability.

According to an aspect of the present invention, there is provided a floor coating material used for the coating of a floor and including components (A) to (E) below as essential components: component (A): a bifunctional (meth)acrylate compound not having an alicyclic structure; component (B1): a trifunctional or more urethane (meth)acrylate oligomer; component (B2): a hexafunctional or more urethane (meth)acrylate oligomer other than the component (B1); component (C): a melamine (meth)acrylate; component (D): metal oxide nanoparticles; and component (E): an active energy ray polymerization initiator. The amount of component (A) contained is more than 24 weight % and less than 60 weight %, the amount of component (B1) contained is more than 10 weight % and less than 35 weight %, and the amount of component (C) contained is not less than 10 weight % and less than 20 weight %, and component (E) contains a hydrogen abstraction photopolymerization initiator.

Here, a trifunctional (meth)acrylate compound having an alkylene oxide chain may be further included.

The component (A) may be one or more selected from the group consisting of 1, 6-hexanediol di(meth)acrylate and neopentyl glycol hydroxypivalic acid eater di(meth)acrylate.

The metal oxide of the component (D) may be one or more selected from the group consisting of silica and alumina.

According to another aspect of the present invention, there is provided a floor coating material comprising of the above coating composition.

According to another aspect of the present invention, there is provided a coating layer formed on a floor and formed of above floor coating material.

As described above, the floor coating material according to an embodiment of the present invention has the composition described above. Thus, the occurrence of a zipper line is eliminated when the floor coating material is cured. Furthermore, the durability and performance of the cured substance of the floor coating material is improved.

BRIEF DESCRIPTION OF THE DRAWINGS

FIG. 1 is an explanatory diagram for describing a situation in which a zipper line occurs.

DETAILED DESCRIPTION OF THE EMBODIMENT(S)

Hereinafter, referring to the appended drawings, preferred embodiments of the present invention will be described in detail.

1. Situation in which a Zipper Line Occurs

An object of the floor coating material according to the present embodiment is to eliminate the occurrence of a zipper line. Thus, first, a situation in which a zipper line occurs is briefly described in FIG. 1.

FIG. 1 is a 2D diagram of a floor surface; an uncured floor coating composition (an ultraviolet curable floor coating composition) is applied in areas 10 and 20. The worker, first, moves an ultraviolet irradiation equipment in area 10 in the direction of arrow A to cure the floor coating composition in area 10. Now, ultraviolet light is irradiated from the ultraviolet irradiation equipment toward the floor coating material. Thereby, the floor coating composition in area 10 is sufficiently cured. While curing the floor coating composition in area 10, a small amount of ultraviolet light leaks from the ultraviolet irradiation equipment, exposing the floor coating composition in area 30 to ultraviolet light. However, in area 40 that was exposed to the leaked ultraviolet light from the irradiation equipment, the floor coating composition is not sufficiently cured. Therefore, a zipper line 50 occurs in area 40 that is the boundary between area 10 where the floor coating material is sufficiently cured (cured portion) and area 20a where ultraviolet light was not directly applied from the ultraviolet irradiation equipment. By the present embodiment, the occurrence of such a zipper line 50 can be suppressed. The present embodiment will now be described in detail.

2. Floor Coating Material

Next, the composition of a floor coating composition according to the present embodiment is described. The floor coating composition according to the present embodiment is used for the coating of a floor, and contains components (A) to (E) below as essential components.
Component (A): a bifunctional (meth)acrylate compound not having an alicyclic structure
Component (B1): a trifunctional or more urethane (meth)acrylate oligomer
Component (B2): a hexafunctional or more urethane (meth)acrylate oligomer other than component (B1)
Component (C): a melamine (meth)acrylate
Component (D): metal oxide nanoparticles
Component (E): an active energy ray polymerization initiator The floor coating composition preferably further contains a trifunctional (meth)acrylate compound having an alkylene oxide chain (component (F)). In this case, the effect of the present embodiment is obtained more effectively.

Component (A) is a bifunctional (meth)acrylate compound not having an alicyclic structure. Component (A) has a structure in which two or more (meth)acrylate structures are bonded to the main structure. Here, the main structure of component (A) may have any structure not having an alicyclic structure. For example, the main structure of component (A) may include a chain-like aliphatic structure or may include an aromatic structure. The main structure may include both of these structures. The chain-like aliphatic structure may be in a straight chain form or in a branched form. The chain-like aliphatic structure may have only single bonds, or may have an unsaturated bond. The aromatic structure may have a structure in which a plurality of aromatic rings are linked via a single bond or a hydrocarbon group, or may have a structure in which a plurality of aromatic rings are condensed. Component (A) preferably includes a chain-like aliphatic structure. Part of the hydrocarbon forming the main structure may be substituted with a substituent. Examples of the substituent include a hydroxyl group, an ether, a carbonyl group, and the like.

Specifically, component (A) is preferably one or more selected from the group consisting of 1, 6-hexanediol di(meth)acrylate and neopentyl glycol hydroxypivalic acid ester di(meth)acrylate. Component (A) may be composed of one of these, or may be composed of both of these. In this case, the effect of the present embodiment is obtained more effectively.

The amount of component (A) contained is more than 24 weight % and less than 50 weight % relative to the gross mass of the floor coating material. The effect of the present embodiment is obtained in the case where the amount of component (A) contained is a value in this range. The lower limit value of the amount of component (A) contained is preferably 25 weight % or more.

Component (B1) is a trifunctional or more urethane (meth)acrylate oligomer. That is, component (B1) has a structure in which three or more (meth)acrylate structures are bonded to the main structure. The main structure has a structure in which a plurality of urethane acrylate monomers are polymerized. The main structure may include an aliphatic structure or may include an aromatic structure, in addition to urethane bonds. The main structure may include both an aliphatic structure and an aromatic structure. The aliphatic structure may be in a chain form or in a ring form. The chain-like aliphatic structure may be in a straight-chain form or in a branched form. The chain-like aliphatic structure may have only single bonds, or may have an unsaturated bond. The aromatic structure may have a structure in which a plurality of aromatic rings are linked via a single bond or a hydrocarbon group, or may have a structure in which a plurality of aromatic rings are condensed. The main structure preferably includes an aliphatic structure in addition to urethane bonds. Part of the hydrocarbon forming the main structure may be substituted with a substituent. Examples of the substituent include a hydroxyl group, an ether, a carbonyl group, and the like.

The weight average molecular weight of component (B1) is preferably not less than 1000 and not more than 4000. In this case, the effect of the present embodiment is obtained more effectively.

The amount of component (B1) contained is more than 10 weight % and less than 35 weight % relative to the gross mass of the floor coating material. The effect of the present embodiment is obtained in the case where the amount of component (B1) contained is a value in this range. The lower limit value of the amount of component (B1) contained is preferably 12 weight % or more. The upper limit value of component (B1) is preferably 30 weight % or less.

Component (B2) is a hexafunctional or more urethane (meth)acrylate oligomer other than component (B1). That is, component (B2) has a structure in which six or more (meth)acrylate structures are bonded to the main structure. The main structure has a structure in which a plurality of urethane acrylate monomers are polymerized. The main structure may include an aliphatic structure or may include an aromatic structure, in addition to urethane bonds. The main structure may include both an aliphatic structure and an aromatic structure. The aliphatic structure may be in a chain form or in a ring form. The chain-like aliphatic structure may be in a straight-chain form or in a branched form. The chain-like aliphatic structure may have only single bonds, or may have an unsaturated bond. The aromatic structure may have a structure in which a plurality of aromatic rings are linked via a single bond or a hydrocarbon group, or may have a structure in which a plurality of aromatic rings are condensed. The main structure preferably includes an aliphatic structure in addition to urethane bonds. Part of the hydrocarbon forming the main structure may be substituted with a substituent. Examples of the substituent include a hydroxyl group, an ether, a carbonyl group, and the like.

The weight average molecular weight of component (B2) is preferably not less than 1000 and not more than 4000. In this case, the effect of the present embodiment is obtained more effectively.

The amount of component (B2) contained is not particularly limited as long as the effect of the present embodiment is not impaired, but is preferably not less than 10 weight % and not more than 15 weight % relative to the gross mass of the floor coating material. The effect of the present embodiment is obtained more effectively in the case where the amount of component (B2) contained is a value in this range.

Component (C) is a melamine (meth)acrylate. That is, component (C) has a structure in which one or more (meth)acrylate structures are bonded to the main structure. The main structure includes a melamine structure. The main structure may include an aliphatic structure or may include an aromatic structure, in addition to a melamine structure. The main structure may include both an aliphatic structure and an aromatic structure. The aliphatic structure may be in a chain form or in a ring form. The chain-like aliphatic structure may be in a straight-chain form or in a branched form. The chain-like aliphatic structure may have only single bonds, or may have an unsaturated bond. The aromatic structure may have a structure in which a plurality of aromatic rings are linked via a single bond or a hydrocarbon group, or may have a structure in which a plurality of aromatic rings are condensed. The main structure preferably includes an aliphatic structure in addition to a melamine structure. Part of the hydrocarbon forming the main structure may be substituted with a substituent. Examples of the substituent include a hydroxyl group, an ether, a carbonyl group, and the like.

The amount of component (C) contained is not less than 10 weight % and less than 20 weight % relative to the gross mass of the floor coating material. The effect of the present embodiment is obtained in the case where the amount of component (C) contained is a value in this range. A preferred upper limit value of component (C) is 15 weight % or less.

Component (D) is metal oxide nanoparticles. That is, it is metal oxide particles with a particle diameter of the order of nanometers. The metal oxide that forms component (D) is preferably one or more selected from the group consisting of silica and alumina. In this case, the effect of the present embodiment is obtained more effectively.

The amount of component (D) contained is not particularly limited as long as the effect of the present embodiment is not impaired, but is preferably approximately not less than 1 weight % and not more than 6 weight % relative to the gross mass of the floor coating material. The effect of the present embodiment is obtained more effectively in the case where the amount of component (D) contained is a value in this range.

Component (E) is an active energy ray polymerization initiator. Component (E) contains at least a hydrogen abstraction photopolymerization initiator as an active energy ray polymerization initiator. Thereby, the effect of the present embodiment is obtained more effectively. The hydrogen abstraction photopolymerization initiator may be one that acts by means of a single component or one that acts by means of a plurality of types of components. Examples of the hydrogen abstraction photopolymerization initiator include benzophenone-based compounds such as benzophenone, Methyl o-benzoylbenzoate-4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl)benzophenone, and 3,3'-dimethyl-4-methoxybenzophenone; thioxanthone-based compounds such as 2-isopropylthioxanthone, 2,4-dimethylthioxanthone, 2,4-diethylthioxanthone, and 2,4-dichlorothioxanthone; aminobenzophenone-based compounds such as Michler's ketone and 4,4'-diethylaminobenzophenone; 10-butyl-2-chloroacridone, 2-ethylanthraquinone, 9,10-phenanthrenequinone, camphorquinone, phenylglyoxylic acid methyl eater, and a mixture of oxy-phenyl-acetic acid 2-[2-oxo-2-phenyl-acetoxy-ethoxy]-ethyl eater and oxy-phenyl-acetic acid 2-[2-hydroxy-ethoxy]-ethyl ester; and the like. Component (E) may further contain an active energy ray polymerization initiator other than a hydrogen abstraction photopolymerization initiator. The type of the other active energy ray polymerization initiator is not particularly questioned, and may be any initiator that is activated when irradiated with an energy ray and initiates the polymerization of components (A) to (C) and (F). Here, the energy ray is light, for example, or may be an electron beam or the like.

The amount of component (E) contained is not particularly limited as long as the effect of the present embodiment is not impaired, but is preferably approximately not less than 2 weight % and not more than 6 weight % relative to the gross mass of the floor coating material. The effect of the present embodiment is obtained more effectively in the case where the amount of component (E) contained is a value in this range. Here, the floor coating material may contain a curing agent other than component (E), such as a thermal polymerization initiator. Examples of the thermal polymerization initiator include an organic peroxide, an azo compound, and the like. Examples of the organic peroxide include ketone peroxides, diacyl peroxides (benzoyl peroxide and the like), hydroperoxides, dialkyl peroxides, peroxyketals, alkyl peresters, percarbonates, and the like. Examples of the azo compound include azobisisobutyronitrile (AIBN), azobis(2,4-dimethylvaleronitrile), dimethyl 2,2'-azobia(isobutyrate), and the like. In the case where the floor coating composition contains a curing agent other than component (E), the total amount of component (E) and the curing agent other than component (E) contained is preferably approximately not less than 2 weight % and not more than 6 weight % relative to the gross mass of the floor coating composition.

Component (F) has a structure in which three or more (meth)acrylate structures are bonded to the main structure. Here, the main structure of component (F) has an alkylene oxide chain. The main structure may further include an aromatic structure. The aromatic structure may have a structure in which a plurality of aromatic rings are linked via a single bond or a hydrocarbon group, or may have a structure in which a plurality of aromatic rings are condensed. Part of the hydrocarbon forming the main structure may be substituted with a substituent. Examples of the substituent include a hydroxyl group, a carbonyl group, and the like. Component (F) may be ethoxylated (9) trimethylolpropane triacrylate, for example.

The amount of component (F) contained is not particularly limited as long as the effect of the present embodiment is not impaired, but is preferably approximately not less than 12 weight % and not more than 16 weight % relative to the gross mass of the floor coating composition. The effect of the present embodiment is obtained more effectively in the case where the amount of component (F) contained is a value in this range. In particular, by adding component (F) to the floor coating composition, the flexibility of the cured substance of the floor coating material is increased, and the amount of contraction during the curing of the floor coating material can be reduced.

Various additives may be added to the floor coating composition as long as the effect of the present embodiment is not impaired. Examples of the additive include a wetting additive, a defoamer, etc.

3. Examples of Use of Floor Coating Composition

3-1. Use Example 1

Next, examples of the use of the floor coating composition are described. In Use Example 1, the floor coating composition is applied to a floor of a building. Subsequently, the floor coating composition on the floor is cured using a movable ultraviolet irradiation equipment, forming a layer of the cured floor coating composition on the floor. While curing the floor coating composition on the floor with the movable ultraviolet irradiation equipment, light leakage can occur. When this leakage occurs, areas adjacent to the curing path will be exposed to incidental ultraviolet light and will become partially cured. In the presence of certain components with high glass transition temperatures, a hard surface film develops during this unintentional ultraviolet light exposure and the area experiences shrinkage. But then later, when under normal conditions, a new curing path is created by the ultraviolet irradiation equipment and uncured and "partially cured" areas are intentionally exposed, the uncured areas also experience shrinkage. The difference in shrinkage of the unintentional versus intentionally cured areas may result in surface defects referred as zippering or a zipper line. With the floor coating composition described above, the occurrence of a zipper line is eliminated. Thus, the worker can continue working without being concerned about defects caused by ultraviolet light leakage from the ultraviolet irradiation equipment. Furthermore, the coating layer made of the cured substance of the floor coating material has excellent durability. That is, in a floor structure comprised of the floor and the coating layer, the occurrence of a zipper line is suppressed, and high durability is achieved.

3-2. Use Example 2

In Use Example 2, the floor coating material is applied to a floor panel, and is cured. Specifically, first, a floor coating is applied to a floor. Subsequently, the floor coating composition on the floor material is cured. The ultraviolet irradiation equipment used for curing is not particularly limited; when the floor material is large, the movable ultraviolet irradiation equipment described above may be used. In this case, ultraviolet light may leak, but the occurrence of a zipper line is suppressed.

EXAMPLES

<1. Preparation of Floor Coating Material>

Next, Examples of the present embodiment are described. In the Examples, the materials listed below are mixed at the mass ratios shown in Table 1, and thereby floor coating materials according to Examples 1 to 6 and Comparative Examples 1 to 10 were prepared.

In Table 1, "Miramer M210" and "Miramer M200" (both are produced by Miwon Specialty Chemical Co. LTD) correspond to component (A). Specifically, "Miramer M210" is neopentyl glycol hydroxypivalic acid ester diacrylate, and "Miramer M200" is 1, 6-hexanediol diacrylate.

"SR833" (produced by SARTOMER Corp.) is a bifunctional (meth)acrylate compound having an alicyclic structure (component (A')). Specifically, "SR833" is tricyclodecanedimethanol diacrylate.

"Photomer 6010" (produced by IGM Resins B.V.) corresponds to component (B1), and "Miramer PU610" (produced by Miwon Specialty Chemical Co. LTD) corresponds to component (B2). The mass average molecular weight of "Photomer 6010" and "Miramer PU610" is 1800. "Miramer SC9610" (produced by Miwon Specialty Chemical Co. LTD) corresponds to component (C).

"Nanobyk 3602" (produced by BYK-Chemie GmbH) corresponds to component (D). "Darocur MBF" (produced by BASF SE) corresponds to component (E). Here, "Darocur MBF" is a hydrogen abstraction photopolymerization initiator. "Darocur 1173" (produced by BASF SE) is an acetophenone-based photopolymerization initiator (component (E')).

"SR502" (produced by SARTOMER Corp.) corresponds to component (F). Specifically, "SR502" is an ethoxylated trimethylolpropane triacrylate (the total number of EO units repeated in a molecule=9).

"Tego Wet 270" and "Tego Airex 920" (both are produced by Evonik Industries AG) are additives. Specifically, "Tego Wet 270" is a wetting additive, and "Tego Airex 920" is a defoamer.

TABLE 1

| | | Example | | | | | | Comparative Example | | | | | | | | | |
|---|---|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 | 9 | 10 |
| Component (A) | Miramer M210 | 24 | | 35 | 24 | 14 | 24 | 24 | 34 | 24 | 24 | 24 | 24 | | 24 | 24 | 24 |
| | Miramer M200 | 25.6 | 35 | | 11 | 11 | 11 | 11 | 11 | 11 | 17 | | | 11 | 11 | 11 | 11 |
| Component (A') | SR833 | | | | | | | | | | | | | 11 | 24 | | |
| Component (B1) | Photomer 6010 | 20 | 20 | 20 | 20 | 30 | 12.5 | | 10 | 20 | 20 | 20 | 20 | 20 | 20 | 35 | 10 |
| Component (B2) | Miramer PU610 | 10 | 10 | 10 | 10 | 10 | 12.5 | 10 | 10 | | 10 | 10 | 10 | 10 | 10 | 5 | 10 |
| Component (C) | Miramer SC9610 | 10 | 10 | 10 | 10 | 10 | 15 | 30 | 10 | 20 | 10 | 10 | 10 | 10 | 10 | | 20 |
| Component (D) | Nanobyk 3602 | 6 | 6 | 6 | 6 | 6 | 6 | 6 | 6 | 6 | | 6 | 6 | 6 | 6 | 6 | 6 |
| Component (E) | Darocure M8F | 4 | 4 | 4 | 4 | 4 | 4 | 4 | 4 | 4 | 4 | 4 | 4 | 4 | | 4 | 4 |
| Component (E') | Darocure 1173 | | | | | | | | | | | | | | | 4 | |

TABLE 1-continued

|  |  | Example | | | | | | Comparative Example | | | | | | | | | |
| --- | --- | --- | --- | --- | --- | --- | --- | --- | --- | --- | --- | --- | --- | --- | --- | --- | --- |
|  |  | 1 | 2 | 3 | 4 | 5 | 6 | 1 | 2 | 3 | 4 | 5 | 6 | 7 | 8 | 9 | 10 |
| Component (F) | SR502 |  | 14.6 | 14.6 | 14.6 | 14.6 | 14.6 | 14.6 | 14.6 | 14.6 | 14.6 | 14.6 | 14.6 | 14.6 | 14.6 | 14.6 | 14.6 |
| Wetting additive | Tego Wet 270 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| defoamer | Tego Airex 920 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| total |  | 100 | 100 | 100 | 100 | 100 | 100 | 100 | 100 | 100 | 100 | 100 | 100 | 100 | 100 | 100 | 100 |
| Pencil hardness |  | 7H | 6H | 8H | 7H | 7H | 7H | 8H | 7H | 6H | 7H | 8H | 8H | 7H | 7H | 5H | 8H |
| Adhesion |  | 5B | 5B | 5B | 5B | 5B | 5B | 5B | 5B | 5B | 5B | 5B | 5B | 5B | 5B | 5B | 5B |
| 60° Gloss |  | 89.4 | 89.7 | 88.9 | 89.7 | 92 | 90 | 91 | 89 | 89 | 91.5 | 91 | 92 | 93 | 81 | 90 | 91 |
| Solvent resistance |  | 3 | 3 | 2 | 2 | 3 | 3 | 1 | 3 | 1 | 1 | 2 | 2 | 2 | 1 | 2 | 1 |
| Abrasion resistance |  | 3 | 3 | 3 | 2 | 2 | 2 | 1 | 1 | 2 | 1 | 2 | 2 | 3 | 3 | 2 | 2 |
| Zipper line |  | 3 | 3 | 3 | 3 | 3 | 3 | 3 | 3 | 3 | 3 | 1 | 1 | 1 | 1 | 3 | 3 |

<2. Evaluation Tests>

The following various evaluation tests were performed to evaluate each floor coating material.

(2-1. Pencil Hardness)

The pencil hardness was evaluated in accordance with ASTM D3363. First, a coating film test piece was prepared. Specifically, the floor coating material shown in Table 1 was applied to a vinyl composite tile so as to have a thickness of 3 mil. Subsequently, using a light irradiation equipment of EX412 manufactured by Jelight Company Inc, ultraviolet light of 682 mJ/cm$^2$ was applied to the floor coating material. Thereby, the floor coating material was cured. A coating film test piece was produced by the above process. Subsequently, the coating film test piece was scratched with pencils with various hardnesses at an angle of 45°, and the hardness value of the pencil at the time when breaking occurred in the coating film layer was taken as the pencil hardness. In this test, 6H or more is good. The evaluation results are shown in Table 1.

(2-2. Adhesion)

The adhesion was evaluated in accordance with ASTM D3359. First, a coating film test piece was prepared by a similar method to "2-1. Pencil hardness." Subsequently, the coating film test piece was cut into a grid form with intervals of 1 mm to form 100 squares of a 1 mm×1 mm size. An operation that strongly adheres an adhesive test tape to the formed grid and then rapidly peels off the tape at an angle of 180° was repeated three times, and then the state of the grid was checked; the result was evaluated in accordance with the following criteria.

5B: there is no peeling in the end portion or the grid.
4B: there is weak peeling in the end portion (the area of peeling is less than 5% of the gross area of the grid).
3B: small peeling and breaking are seen in the end portion (the area of peeling is less than 15% of the gross area of the grid).
2B: large peeling and breaking are seen in the end portion and the grid (the area of peeling is less than 35% of the gross area of the grid).
1B: there is large ribbon-like peeling (the area of peeling is in the range of 35 to 65% of the gross area of the grid).
0B: the adhesive strength is weak (the area of peeling is more than 65% of the gross area of the grid).

4B or more was classified as good. The results are collectively shown in Table 1.

(2-3. 60° gloss)

The 600 gloss was evaluated in accordance with ASTM D523. First, a coating film test piece was prepared by a similar method to "2-1. Pencil hardness." Subsequently, the 60 gloss of the coating film test piece was measured using a glossmeter. That is, the 60° gloss was measured by setting each of the angle of incidence and the angle of light acceptance to 60°. Subsequently, the obtained result was indicated by the percentage of the glossiness (100) of a reference surface.

(2-4. Solvent Resistance)

First, a coating film test piece was prepared by a similar method to "2-1. Pencil hardness." Subsequently, cotton permeated with methyl ethyl ketone (MEK) was moved back and forth 200 times on the surface of the coating film test piece. The 60° gloss was measured before and after this solvent resistance test. Subsequently, the solvent resistance was evaluated based on the gloss difference (ΔG) and the following evaluation criteria.

3: ΔG<3 (excellent)
2: 3≤ΔG<5 (good)
1: ΔG≥5 (bad)

(2-5. Abrasion Resistance)

The abrasion resistance was evaluated using Sutherland (registered trademark) Ink Rub Tester. First, a coating film test piece was prepared by a similar method to "2-1. Pencil hardness." Subsequently, #0000 steel wool attached to a 2 pound load was moved back and forth 100 times on the surface of the coating film test piece. The 60° gloss was measured before and after this abrasion test. The abrasion resistance was evaluated based on the gloss difference (ΔG) and the following evaluation criteria.

3: ΔG<3 (excellent)
2: 3≤ΔG<5 (good)
1: ΔG≥5 (bad)

(2-6. Zipper Line)

The floor coating material was applied to a vinyl composite tile (6×12 inches) so as to have a thickness of 3 mil. Subsequently, a light irradiation equipment (EX412 manufacture by Jelight Company Inc) was moved in a half area of the tile. 10 minutes later, the light irradiation equipment was moved in the remaining half area. Subsequently, evaluation was made for the zipper line by the following evaluation criteria.

3: there is no zipper line
1: there is a zipper line

<3. Evaluation>

According to Table 1, in Examples 1 to 6 having the composition of the present embodiment, a zipper line did not occur, and the durability (specifically, pencil hardness, adhesion, solvent resistance, and abrasion resistance) was excellent. For the gloss, a value with no problem was obtained. In contrast, in Comparative Examples 1 to 10, a zipper line occurred or the durability was poor.

Specifically, in Comparative Example 1, component (B1) is not contained. Further, in Comparative Example 1, the amount of component (C) contained is 20 weight % or more. Hence, the solvent resistance and the abrasion resistance were poor. In Comparative Example 2, the amount of component (B1) contained is 10 weight % or less. Hence, the abrasion resistance was poor. In Comparative Example 3, component (B2) is not contained. Further, the amount of component (C) contained is 20 weight % or more. Hence, the solvent resistance was poor. In Comparative Example 4, component (D) is not contained. Hence, the solvent resistance and the abrasion resistance were poor. In Comparative Examples 5 to 7, the amount of component (A) contained is 24 weight % or less. Hence, a zipper line occurred. From Comparative Examples 6 and 7, it has been found that an improvement in effect was not seen even if component (A'), that is, an acrylate compound having an alicyclic structure was used in order to make up for the deficiency in component (A). In Comparative Example 8, the photopolymerization initiator is not of a hydrogen abstraction type, and therefore the solvent resistance was poor and a zipper line occurred. In Comparative Example 9, the amount of component (B1) contained is 35 weight % or more. Further, in Comparative Example 9, component (C) is not contained. Hence, the pencil hardness was poor. In Comparative Example 10, the amount of component (B1) contained is 10 weight % or less, and the amount of component (C) contained is 20 weight % or more. Hence, the solvent resistance was poor.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

What is claimed is:

1. A floor coating composition used for coating of a floor and comprising components (A) to (E) below as essential components:
    component (A): a bifunctional (meth)acrylate compound not having an alicyclic structure;
    component (B1): a trifunctional or more urethane (meth)acrylate oligomer;
    component (B2): a hexafunctional or more urethane (meth)acrylate oligomer other than the component (B1);
    component (C): a melamine (meth)acrylate;
    component (D): metal oxide nanoparticles; and
    component (E): an active energy ray polymerization initiator,
    wherein the amount of component (A) contained is more than 24 weight % and less than 50 weight %, the amount of component (B1) contained is more than 10 weight % and less than 35 weight %, the amount of component (B2) contained is not less than 10 weight % and not more than 15 weight %, and the amount of component (C) contained is not less than 10 weight % and less than 20 weight %, and
    wherein component (E) contains a hydrogen abstraction photopolymerization initiator.

2. The floor coating composition according to claim 1, further comprising component (F): a trifunctional (meth)acrylate compound having an alkylene oxide chain.

3. The floor coating composition according to claim 1, wherein the component (A) is one or more selected from the group consisting of 1, 6-hexanediol di(meth)acrylate and neopentyl glycol hydroxypivalic acid ester di(meth)acrylate.

4. The floor coating composition according to claim 3, wherein the metal oxide of the component (D) is one or more selected from the group consisting of silica and alumina.

5. A flooring material comprising a cured substance of the floor coating composition according to claim 1 on at least one surface.

6. A coating layer formed on a floor and formed of a cured substance of the floor coating composition according to claim 1.

7. The floor coating composition according to claim 1, wherein the amount of component (D) is not less than 1 weight % and not more than 6 weight %.

8. The floor coating composition according to claim 1, wherein the amount of component (E) is not less than 2 weight % and not more than 6 weight %.

9. The floor coating composition according to claim 2, wherein the amount of component (F) is not less than 12 weight % and not more than 16 weight %.

* * * * *